UNITED STATES PATENT OFFICE.

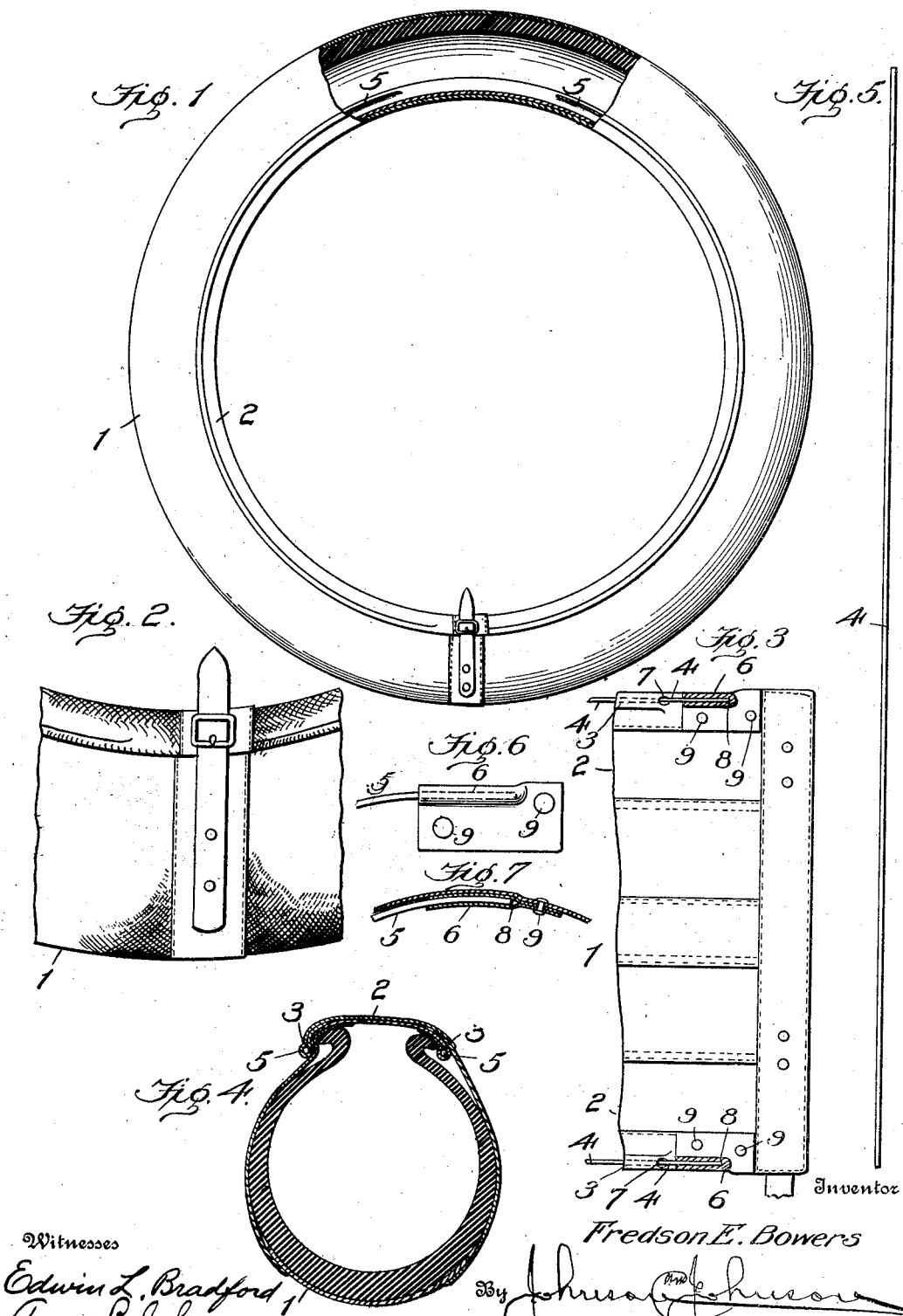

FREDSON E. BOWERS, OF NEW HAVEN, CONNECTICUT.

TIRE-CASE.

No. 832,453.   Specification of Letters Patent.   Patented Oct. 2, 1906.

Application filed May 3, 1906. Serial No. 314,962.

*To all whom it may concern:*

Be it known that I, FREDSON E. BOWERS, a citizen of the United States, residing at New Haven, in the county of New Haven and State of Connecticut, have invented certain new and useful Improvements in Tire-Cases; and I do hereby declare the following to be a full, clear, and exact description of the invention, such as will enable others skilled in the art to which it appertains to make and use the same.

Extra tires are provided for automobiles in case the tire in use is rendered useless, and as the extra tire is carried in exposed position on the automobile it is a necessity to protect it from rain and dirt and in condition for immediate use. A case or cover is provided for inclosing the tire, and for this purpose my improvement resides in novel means for securing the case or cover upon the tire, and in the claims appended hereto I will point out my said improvement in connection with the accompanying drawings, in which—

Figure 1 shows in side view a tire case or cover embodying my improvement as applied to and secured upon a tire. Fig. 2 shows, enlarged, the lapping ends and edges of the cover as they are fastened upon the tire. Fig. 3 shows the inner side of one end of the case or cover and a pair of metallic sockets, one at each edge near the end of the case to receive and confine the ends of a pair of spring-hoops by which the cover is secured upon the tire, the sockets being shown in section and as forming abutments to keep the ends of the spring-hoop in place and constant expansive force. Fig. 4 shows a cross-section of a tire and the case or cover fastened thereon by my resilient expansive hoop. Fig. 5 shows a straight piece of steel wire which is formed into the retaining-hoop by the act of inserting it into pockets or channels formed at the edges of the tire and within which it exerts an expansive force. Fig. 6 shows one of the metal abutments for the hoop ends. Fig. 7 is a sectional view of the same.

Wire hoops have been used with various constructions of tires for retaining them upon the rim portion of the tire, and wire hoops have been used with various constuctions of covers for tires to connect their edges and to retain them in place upon the tire, and for these purposes the hoops are formed before being applied for use with the tires or with the tire-covers and in each case having their ends connected after having been applied; but so far as I know and can find I am the first to apply such retaining-hoop to a tire or to a tire-cover before it has been given the form of a hoop or ring and to make it thereby a retaining-spring disconnected at its ends, and to provide a socket having a fixed relation to each end of the case or cover to receive and confine each end of the hoop, as a fixed part of the case, whereby said hoop is caused to have a resilient and expansive action on the case to secure it upon the tire and keep the edges of the case in close lapping relation, whether on a closed or an open clencher-tire.

Each circular edge of the cover 1 is preferably provided with a lap or binder 2, as in my patent of January 10, 1905, No. 779,578, for tire-cover, and the cover and the laps are made to form a circular case or cover for the tire, with the laps extending over the opening of the tire. The edge of each lap is bound with a hem so as to form a circular channel or pocket 3, which opens at both ends near each end of the case, which is bisected transversely for that purpose. Into each of these pockets or channels is inserted not a wire hoop already formed and which can have no resilient function on the case or cover, but a straight steel wire 4, which as it is inserted is automatically caused to assume the circular form of the pocket or channel in the edge of the lap, and thereby becomes a spring-hoop 5, having its resilient force exerted upon the cover to clamp and hold its edges in contact with the walls or shoulders of the tire. This resilient force of the hoop is rendered active at all times by reason of having its ends confined in metallic sockets 6, which form abutments against which the ends 8 of the spring-hoop constantly press and insure a close fitting of the case or cover upon the tire. The steel wire thus inserted into the pocket of the hem or lap is caused to protrude at each end through a hole or open end 7 in the hem of the lap a short distance from the end of the case. A retaining-hoop is provided for each edge of the case or cover, and a metallic socket is provided for each end of each hoop and fastened, preferably by rivets 9, to the inner side of the hem at the edge of the cover, and for this purpose the sockets are preferably pressed into form at the edge of a metal plate 9. The ends of the hoops are therefore inclosed within the case or cover outside of the pockets or channels, as in Fig. 3, and it is important for the proper holding function of the hoops that their ends be housed so that in the expanding action of the hoops the case or cover will be correspondingly expanded to cause it to tighten on the tire. While I have shown and prefer to form the pockets or channels for the retaining-hoops in the edges of laps, obviously they may be formed on the edges of the case or cover when made of sufficient width to inclose the tire.

It is important to note that the spring-hoop having its ends inclosed in fixed sockets of the cover is caused thereby to act with an expanding-spring function between the sockets, that the hoop does not require to be connected together at its ends, nor to be adjusted to tighten it upon the tire.

I claim—

1. A tire case or cover bisected transversely, and open longitudinally, a retaining spring-hoop therefor fastened at each edge of the cover, and metal sockets fastened to the inner side of the cover near each end thereof within which the ends of the hoop abut and are inclosed and have an expanding action upon the case.

2. A tire case or cover bisected transversely, open longitudinally and having pockets or channels at its edges, a straight steel wire inserted within said edge pockets and caused thereby to assume the form of a hoop conforming to the circle of the cover, and metal sockets fastened to the inner side of the cover near each end thereof whereby to form abutments for the ends of the hoop within the cover.

3. A tire case or cover bisected transversely, and open longitudinally, and a retaining-hoop therefor consisting of a straight strand of steel wire loosely inclosed within each edge of the cover, and metal sockets fastened to the tire for retaining each end of the hoop.

In testimony whereof I have signed my name to this specification in the presence of two subscribing witnesses.

FREDSON E. BOWERS.

Witnesses:
LEON J. BARRETT,
J. L. GILSON.